United States Patent [19]
Tanaka et al.

[11] Patent Number: 5,615,138
[45] Date of Patent: Mar. 25, 1997

[54] METHOD FOR ESTABLISHING THE WORKING MANTIME IN THE PRODUCTION LINE

[75] Inventors: Kozaburo Tanaka; Shinpei Sugiyama; Ken Miura; Hideo Yoneda; Keiji Kinoshita, all of Suzuka; Akira Sakuramoto, Tokyo; Akihiro Ryu, Kameyama; Susumu Fujii, Suzuka; Kimiyuki Yamamoto, Suzuka; Masami Hattori, Suzuka, all of Japan

[73] Assignee: Honda Giken Kogyo Kabushiki Kaisha, Japan

[21] Appl. No.: 526,782

[22] Filed: Sep. 11, 1995

Related U.S. Application Data

[63] Continuation of Ser. No. 43,709, Apr. 8, 1993, abandoned.

[51] Int. Cl.⁶ .................................................. G06F 15/46
[52] U.S. Cl. .................... 364/582; 364/468.15; 364/578; 395/209
[58] Field of Search ...................................... 364/468, 469, 364/552, 581, 582, 554, 551.02, 402, 578, 401, 226.7, 227, 918.6, 227.3, 918.9, 281.8, 942.5, 474.16, 551.01; 395/650, 925, 926

[56] References Cited

U.S. PATENT DOCUMENTS

| | | | |
|---|---|---|---|
| 4,896,269 | 1/1990 | Tong | 364/468 |
| 4,937,743 | 6/1990 | Rassman et al. | 364/401 |
| 5,078,257 | 1/1992 | Carter, Jr. | 198/365 |
| 5,088,045 | 2/1992 | Shimanaka et al. | 364/468 |
| 5,140,537 | 8/1992 | Tullis | 364/578 |
| 5,177,688 | 1/1993 | Rentschler et al. | 364/468 |
| 5,278,750 | 1/1994 | Kancko et al. | 364/401 |

*Primary Examiner*—Emanuel T. Voeltz
*Assistant Examiner*—Craig Steven Miller
*Attorney, Agent, or Firm*—Dickstein Shapiro Morin & Oshinsky LLP

[57] ABSTRACT

Disclosed is a method of establishing working mantime in a production line comprising the steps of: numerically evaluating the work volume for the working means performed in each production process, representing the numeralized work volume as a normal work mantime, then numerically evaluating the fatigue extent of each fatigue task as a fatigue score, and adding the fatigue score to the normal work mantime.

Further, the fatigue score is assigned as a fatigue recovery mantime, and the normal work mantime which includes the fatigue recovery mantime is leveled as uniform, thereby establishing a new production process which includes the leveled fatigue recovery mantime.

5 Claims, 9 Drawing Sheets

FATIGUE RECOVERY MANTIME

METHOD FOR ESTABLISHING THE WORKING MANTIME IN THE PRODUCTION LINE

This application is a continuation, of application Ser. No. 08/043,709, filed Apr. 8, 1993, now abandoned.

BACKGROUND OF THE INVENTION

1. Field of the Invention

The present invention relates to a method for establishing the working mantime in the production line capable of impartially allocating jobs for various production means including workers or robots.

2. Description of the Prior Art

In most cases, in the flow production line, for example in an automobile assembly line, the workload for each process is set out so that the work of each process is completed in the period for flowing an automobile (called a "task"). As specifically, when desired to perform a work requiring mantime of 600 seconds, ten of work processes can be necessary.

By means of the standard time method, a production mantime is obtained such that the work is first classified in single tasks, and a plurality of time periods, each measured for each single task, are summed up. Thus, a production mantime is obtained. Specifically, at a task for integrally assembling two parts A and B by means of n pieces of bolts, if t1 to t5 are defined:

t1: the time necessary for transporting two parts A and B,
t2: the time necessary for positioning these parts to each other,
t3: the time necessary for tightening all bolts,
t4: the time necessary for inspection, and
t5: the time necessary for transporting completed products,
then, the total working mantime is obtained according to the equation:

$$t = t1 + t2 + t3 \times n + t4 + t5 \qquad (1)$$

This total mantime is then divided by the numeral task T, to the result of which each is allocated.

In an automobile assembly line, for assembly of a vehicle, there are processes, such as mounting an engine to the main body, mounting doors and cooler pipes, and these processes are performed by one or a number of working means such as human workers and/or robots.

It is preferable if the workload is uniformly established for all the working means, especially in view of uniform wear of components without loading on parts of a particular positions. In most cases, a mantime calculated using the standard time method is allocated for workers. However, inequity is often likely to occur if only using the mantime obtained by the standard time method.

For instance, even in the task for tightening bolts with the same torque and the same length, the task at a narrow position requires a workload greater than usual, while an additional tightening task rather requires a load smaller than usual.

A production process comprises a plurality of elementary tasks. Among these tasks, those with fatigue greater than the predetermined workload, such as, tasks with hard posture, difficult tasks, or heavy weight tasks, are often included. The fatigue extent of these tasks cannot be represented by means of the conventional standard time method. When the tasks are allocated using this method, there can be caused inequity between workers.

Further, even if the method above is properly applied, fatigue produced by using a specific portion of the worker can be caused, such that a robot is entirely wasted only by being wasted of merely part of components of the robot.

SUMMARY OF THE INVENTION

The present invention is made to solve the afore-mentioned disadvantages.

An object of the invention is to provide a method for evenly allocating the work for the working means, which include not only human workers, and also include, especially at an automated production process, automated machines, such as robots.

In other words, the invention includes a method of establishing a fatigue recovery mantime needed for a production process performed by any working means in accordance with the fatigue extent, and improvement in the form of modification of the installation or specification. As a result, the invention provides a method of establishing production mantime of a production line for providing evenly leveled work for human workers and robots as working means.

DETAILED DESCRIPTION OF THE PREFERRED EMBODIMENTS

Figure 1:
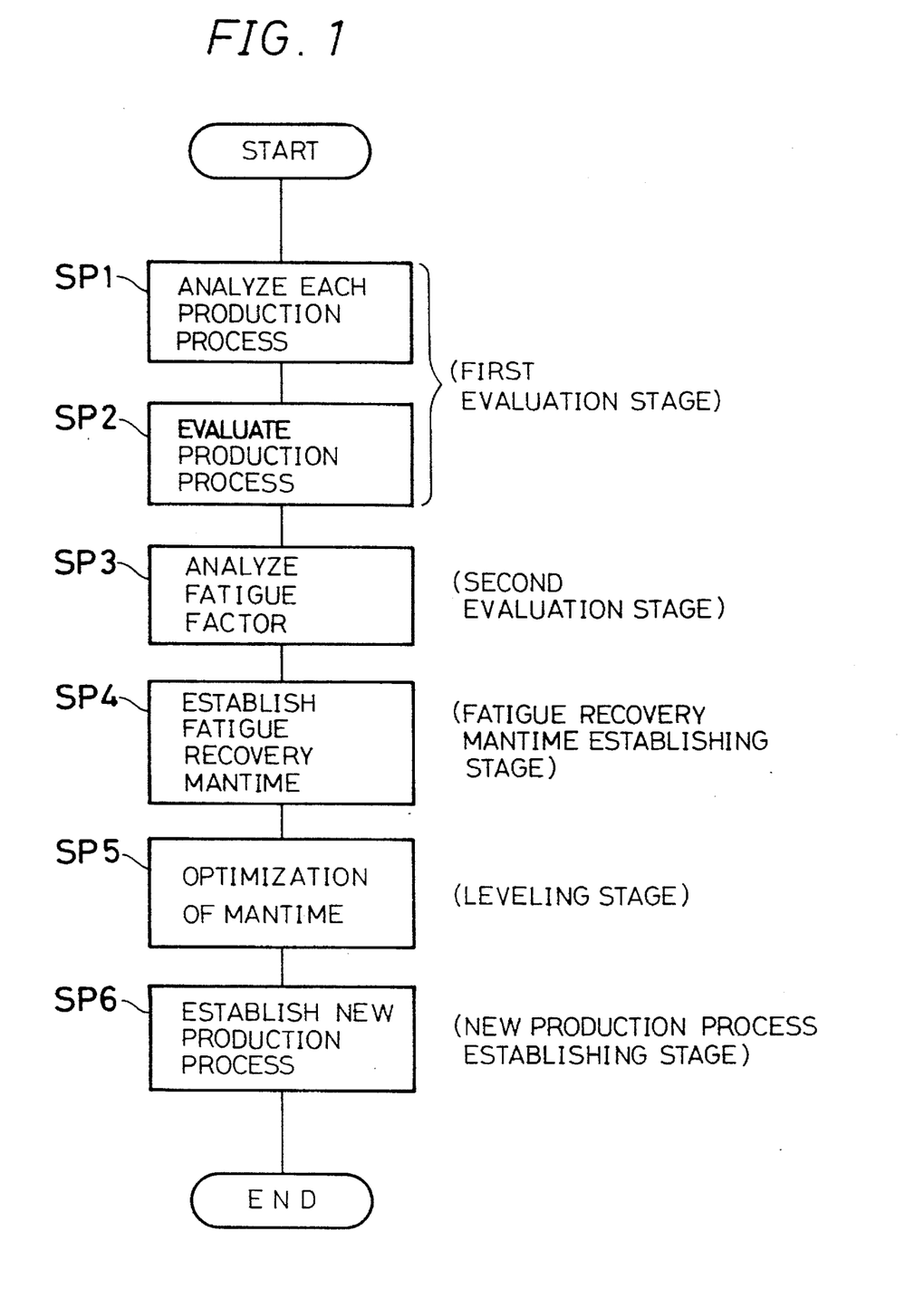
FIG. 1 is a flow chart of an embodiment according to the invention.

Referring now to FIG. 1, an embodiment of the present invention is stated hereinafter. The embodiment relates particularly to an automobile production line, and working means therein for producing automobiles as products include both workers and robots.

Analysis of Production Processes (SP1)

The production line includes a plurality of production processes (hereinafter referred to "processes"), for example, those processes of attaching specification labels, mounting cooler pipes, mounting titan hooks, each process being performed by working means including workers and robots.

Each of these processes comprises one or more main works, subworks, supplementary works, and loss works. Further, each of these consists of a plurality of single tasks. Specifically, the main work is that for mounting those parts for constructing an automobile, and includes single tasks, that is, bolt tightening, parts mounting, attaching of specifications, setting, grease application, positioning, etc.

Subworks are single actions accompanying the main works, such as taking up or putting back of tools or parts, and opening or shutting of caps, etc. Supplementary works, which are essentially unnecessary but inevitable to be performed at the present situation, include fine adjustments and several inspections such as torque check. Loss works, which are also unnecessary in the ideal view point but still inevitable in the present production system, especially include mainly actions for displacement of objects.

Evaluation of Production Processes (SP2)

After classified in single tasks, the work volume of each single task is represented by a working time obtained by the standard time method (hereinafter referred to a normal working mantime). Further, from the obtained normal working mantime, the total work volume of each production process comprising a plurality of single tasks is obtained. Thus, a work volume at each process is determined.

Analysis of Fatigue (SP3)

Each of single tasks is analyzed as to whether it involves any fatigue. The fatigue here is defined as that produced from a difficult work which requires a workload exceeding a predetermined value of load.

Hereinafter, fatigue is specifically discussed.

When fatigue is defined as muscular fatigue, the tasks are classified in (1) tasks done with difficult posture, (2) difficult tasks, and (3) tasks for heavy objects. The tasks with difficult posture include those done by postures, such as done with one's knee deeply bent, in a squatting posture, with one's waist bent, with the upper body slightly forward bent, or with a posture sitting on the floor. The difficult tasks include those with the wrist in a unnatural situation, the finger tip loaded, those incorporating shock or vibration, or a task with a manual hammer. The tasks for heavy objects include those for supporting heavy weight, or securing heavy weight with supporting the same.

For each of these specified tasks, a fatigue score is assigned in accordance with the degree of fatigue caused by each task. The fatigue score is added to the normal working mantime which is obtained by the Standard Time Method mentioned above. In this manner, the overall work volume included in one production process is evaluated.

Other than for a human worker, there can be unnatural postured tasks also for a robot, such as a task performed with the arm or wrist of the robot positioned near the stroke end thereof. As a difficult task therefor, there can be a task with its arm or wrist urged by an excessive load, such as caused by shock or vibration. Instead of defining fatigue based on muscular fatigue, mental fatigue may be also scored depending on its extent to evaluate work volume of a single task. Also, instead of defining fatigue which is produced from any task having a value of workload which exceeds a predetermined value, the degree of workload of each single task may be also numerically evaluated in several grades, and based on the evaluated result, the fatigue score for each single task may be established.

Also, fatigue may be defined for each one production process as a unit, instead of a single task. Alternatively, fatigue may be also defined for a group, which is formed by a plurality of single tasks.

Establishing Fatigue Recovery Mantime (SP4) and Optimization of Mantime (SP5)

Assume that working means (A) and (C) include fatigue score numerals a and b, respectively. The obtained fatigue score is named "fatigue recovery mantime" as indicated by the meshy areas a and c (See SP4).

Figure 2A:
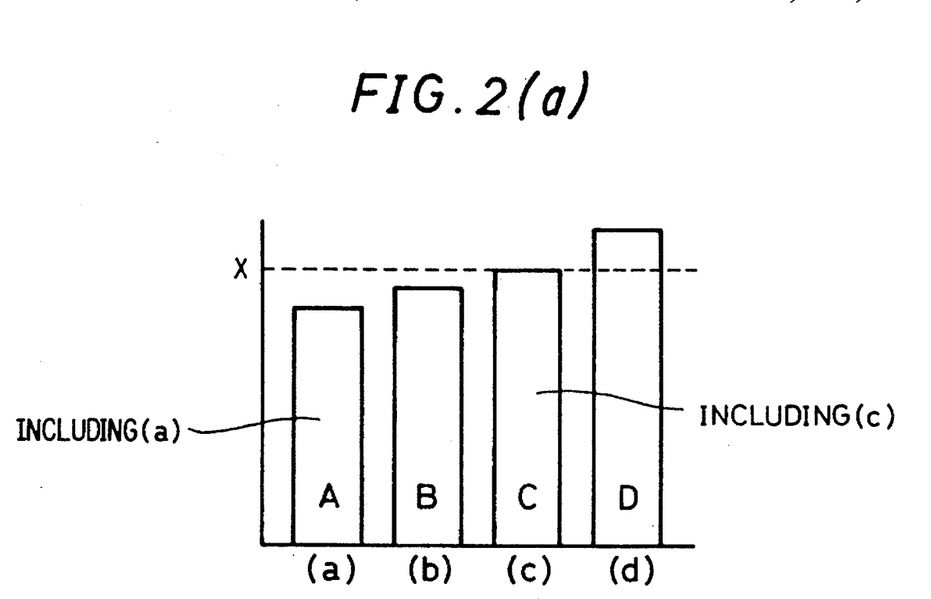
FIGS. 2a and 2b are diagrams representing establishing of fatigue recovery mantime and leveling of mantime.

As can be seen in FIG. 2(I), the uncorrected work volumes A to D for each working means a to d are different from each other according to the content of each work, when these are illustrated by the bar diagram. Thus, for each work volume A and C of working means a and c, a fatigue recovery mantime is established, while, for each of B and D of working means b and d, no fatigue recovery mantime is established.

Then, in order to level these work volumes, adjustment is made such that all the work volumes of working means a, c, b, and d are corrected in the same level.

Also, for leveling the work volumes, another procedure may be applied such that the volumes are allocated, increased or decreased, or reviewed so that these volumes would approach a standard value X indicated in FIG. 2.

After work volumes are leveled as mentioned above, the time which is represented by the fatigue recovery mantime a and c may be given as a rest period.

Also, at leveling process in optimization step SP5 of FIG. 1, fatigue recovery mantime may be compensated according to the increasing or decreasing amount of mantime for each working means a to d. Further, as the recovery mantime, the fatigue score itself may be used or may be obtained by multiplying a predetermined factor to the fatigue score. In general, fatigue recovery mantime is assigned using the time unit same as the case of normal working mantime.

Establishing New Production Processes (SP6)

Figure 2B:
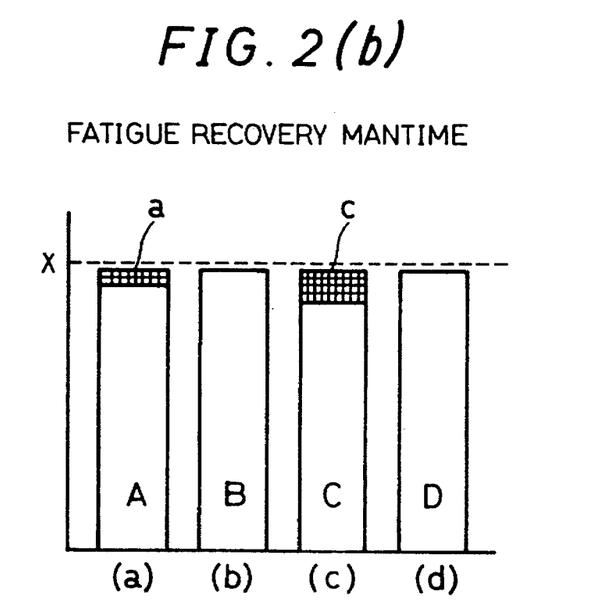

After obtaining fatigue recovery mantime indicated by the meshy areas a and c, a new production process including fatigue recovery mantime is established as shown in FIG. 2(II). Thus, from the newly established production processes, the work volume corresponding to the difficult tasks in question, that is, the fatigue scores a and c, is allocated as the rest period.

As a result, the workload for each of working means A to D can be made impartial.

In the case of a human worker, the labor environment is improved, and for a robot as working means, the robot is prevented from being continuously employed under the unnatural condition, resulting in preventing wear of specified components of the robot and ensuring a long period use of the robot.

As discussed above, an adequate workload according to the fatigue extent can be established as a fatigue recovery mantime, which is allocated to the working means as fatigue recovering time, that is, a rest period. Alternatively, such a program of a flow chart may be stored in advance, from which a new production process including a fatigue recovery mantime is prepared, and the robot is directly operated by the new, modified process or may be directly instructed to a worker through a display or the like. Input operation of these data into the computer may be performed through a keyboard or data readout means using mark sheets, or the like. These data include production processes to be analyzed, single tasks included in each process, and fatigue scores for evaluating the fatigue extent of each single task.

In the present embodiment, steps 1 and 2 together are nominated the first evaluation stage, step 3 the second evaluation stage, step 4 the fatigue recovery stage, step 5 the leveling stage, and step 6 the new production process establishing stage.

Figure 3:
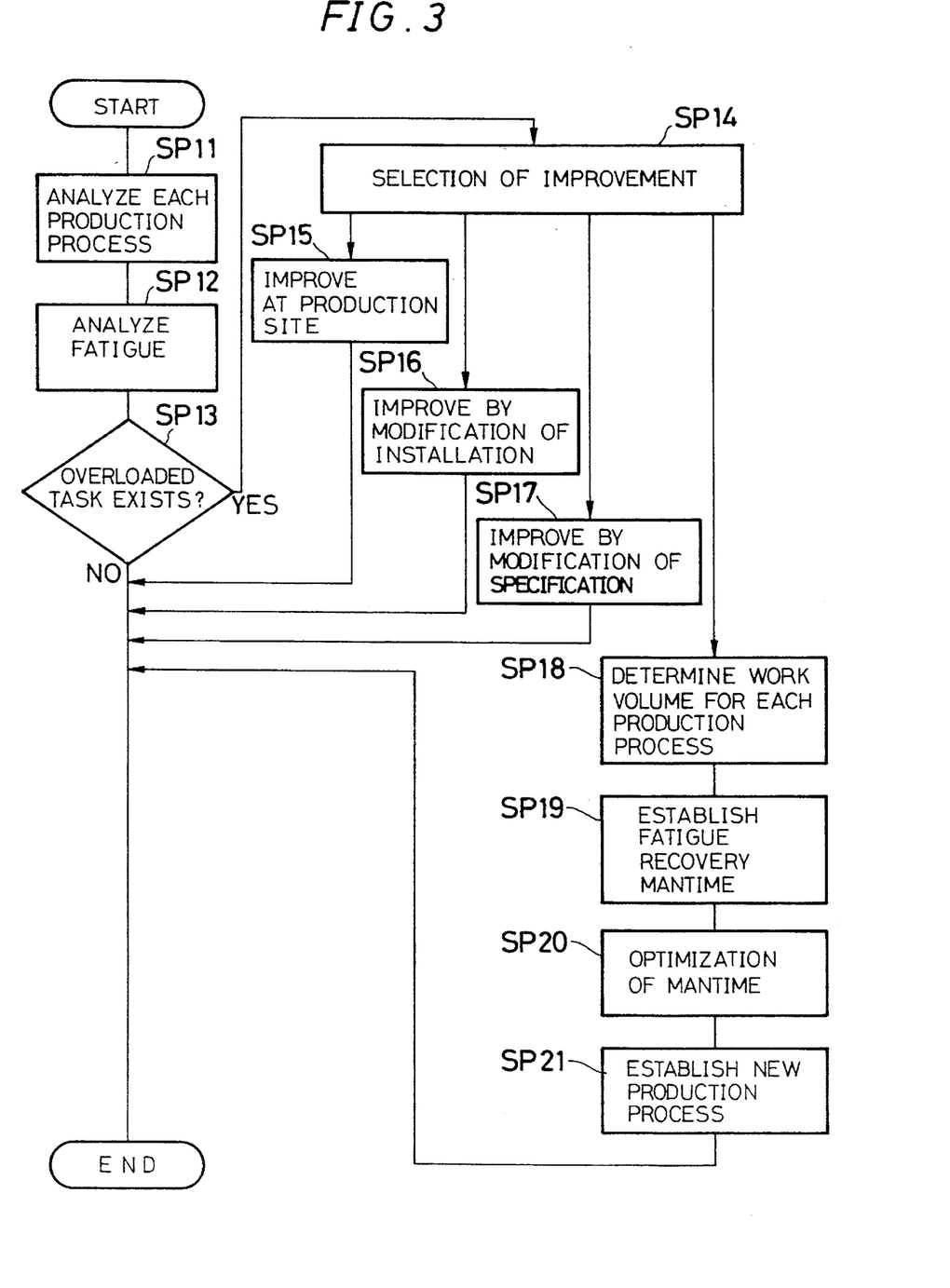
FIG. 3 is a flow chart of another embodiment.

FIG. 3 is a flow chart representing the second embodiment of the present invention. Particularly, the embodiment is discussed on an automobile assembly line.

Analysis of Production Processes (SP11)

The operation performed in step SP11 is fundamentally the same as that in SP1 in FIG. 1.

Analysis of Fatigue (SP12)

STEP 12 assigns a fatigue score for representing the extent of fatigue. Similar to step SP3 of FIG. 1, a fatigue score is assigned for each of unnatural postured task, difficult task, and heavy weight task.

Analysis of Fatigue (SP12)

Then the extent of fatigue generated when performing each single task is represented as a fatigue score. This procedure is fundamentally same as step SP3 of FIG. 3, each of unnatural postured work, difficult work, and heavy weight work are represented respectively as a fatigue score in accordance with the extent of fatigue thereof. For instance, each score numeral is specifically represented by "points" such that the fatigue score for the work performed with the deeply bent knee is assigned to 10 points. Similarly, those tasks with one's shoulder bent, upper body shallow bent, and with sitting on the floor are assigned to each point numerals 9, 6 and 4, respectively. As to the difficult work, the fatigue extent for the work with one's loaded finger tip is scored as 5 points, and similarly, that for the works, with a manual hammer is 5, with shock or vibration is 4, and with one's urged wrist is 2. Also, the heavy weight work is assigned to 10 of fatigue score.

Determination of Overloaded Task (SP13)

STEP SP13 determines whether the fatigue score obtained for each single task exceeds 4.5 or not. If so, each of unnatural postured work, difficult work, and heavy weight work, whose fatigue extent is found to be great, is improved at the step SP14. Instead, when the answer is NO, that is, the fatigue extent is found to be small, there is no necessity of improvement and the flow is finished.

Thus, each task with the score assigned 4.5 or more is represented as an "overloaded task".

Each single task, when the extent thereof is determined greater, is further determined as to possibility of improvement, either at the production site, or by modification of installation or specification, and as to capability of preparing each of new production processes. Based on the results, either one of steps SP15, SP16, SP17, and SP18 is selected.

Although such determination is performed based on the fatigue score mentioned above, the relationship between these fatigue scores and selection of these steps SP15, SP16, SP17 and SP18 is established at the worker's option.

Improving at Production Site (SP15)

Any task of greater fatigue extent is improved at the production site through any of the following methods:

(1) using protecting means: e.g. a stool or stand for protecting one's waist, or a cushion or mat for protecting the knees;

(2) distributing the process, such that a task with a smaller load is interposed between single tasks so as to disperse the tasks with greater load, thus preventing accumulation of fatigue of each worker;

(3) using jigs, so as to support heavy weights, or retaining parts at a desired angle to make ease of mounting work of parts to the automobile body and to reduce the load on workers; or (4) mini-automating, such as to partially automate the manually performed tasks using electromotive tools or the like to reduce the load on workers.

Other than for human workers, improvements applicable for a robot include: re-teaching the robot; reinforcing any of arms or wrists at a specified portion thereof; allocating a heavy load task for a plurality of robots; or providing a shock absorber for preventing transmission of shock.

Improving By Modified Installation (SP16)

Tasks of greater fatigue extent are improved by reviewing the manufacturing installation as follows:

(1) changing the height of conveyers for transporting automobiles to change the height by which the worker performs jobs on automobiles; or (2) providing devices for vertically moving an automobile, or entirely changing the angle of the automobile. In such a manner, for human workers, fatigue tasks, such as those with suspended waist, or in sitting on the floor, are improved. Also, when working means is a robot, the robot is prevented from being continuously employed under the unnatural condition, thereby minimizing any load applied on either the arm, the wrist, and means for relatively displacing the components thereof.

Improving By Modified Specification (SP17)

Modifying the specification of necessary parts, any single task of greater fatigue extent is improved.

For example, bolts as fastening means are replaced by adhesive or fasteners, thereby reducing the number of parts.

Finding Work Volume of Each Process (SP18)—Establishing Fatigue Recovery Mantime (SP19)

In SP18, the work volume of a single task classified in SP11 by a normal mantime obtained by the standard time method. When the task is that incorporating any fatigue, a fatigue score representing the fatigue extent analyzed in SP12 is added to the normal mantime mentioned above. Here, as shown in FIG. 2, the working means A and C are assumed to include a fatigue score a and c, respectively. In this way, each fatigue recovery mantime a and c are assigned for working means A and B, respectively.

From the obtained normal mantime representing the work volume of a single task and the fatigue recovery mantime representing the fatigue score, the overall work volume of each production process is obtained.

Optimization of Mantime (SP20)

After the work volume has been evaluated based on the normal mantime and fatigue score, each production process including a plurality of single tasks is leveled.

In other words, the operation in SP20 is fundamentally the same as that in SP5 of FIG. 1. As shown in FIG. 2(II), the workloads A' and C' for working means A and C, in which fatigue recovery mantime a and c are established, are corrected so as to be leveled to the same level of the workloads B' and D' for working means B and D, in which no fatigue recovery mantime is established.

Establish New Production Line (SP21)

After the fatigue recovery mantime as indicated by the meshy areas a and c is obtained, a production process including fatigue recovery mantime is established as a new production process, and operation of the flow chart terminates.

Then, from the newly established production processes, the work volume corresponding to the difficult tasks in question, that is, the fatigue scores a and c, is allocated as the rest period for recovering fatigue. As a result, the same load is provided against each of working means A' and C', and work can be impartially allocated for these two working means.

When step 13 determines any fatigue exists among production processes, the STEP SP14 determines if such fatigue can be improved either at the production site, or through modifying production facility or specification, or improved by creating any fatigue recovery mantime.

Based on the result thereof, through steps 15, 16, 17; and 18 to 21, step SP15 performs improvement of fatigue tasks at the production site. Similarly, each of steps SP16 and 17 performs improvement by modifying the manufacturing installation and specification, respectively. On the other hand, steps SP18 through 21 perform improvement which includes: SP18 determines work volume, SP19 establishes fatigue recovery mantime, SP20 optimizes such mantime, and finally SP21 establishes each of new production processes.

Accordingly if determined that a production process includes fatigue factor to be eliminated, selection of various improvements provides for human workers or robots with impartial production processes.

Figure 4:
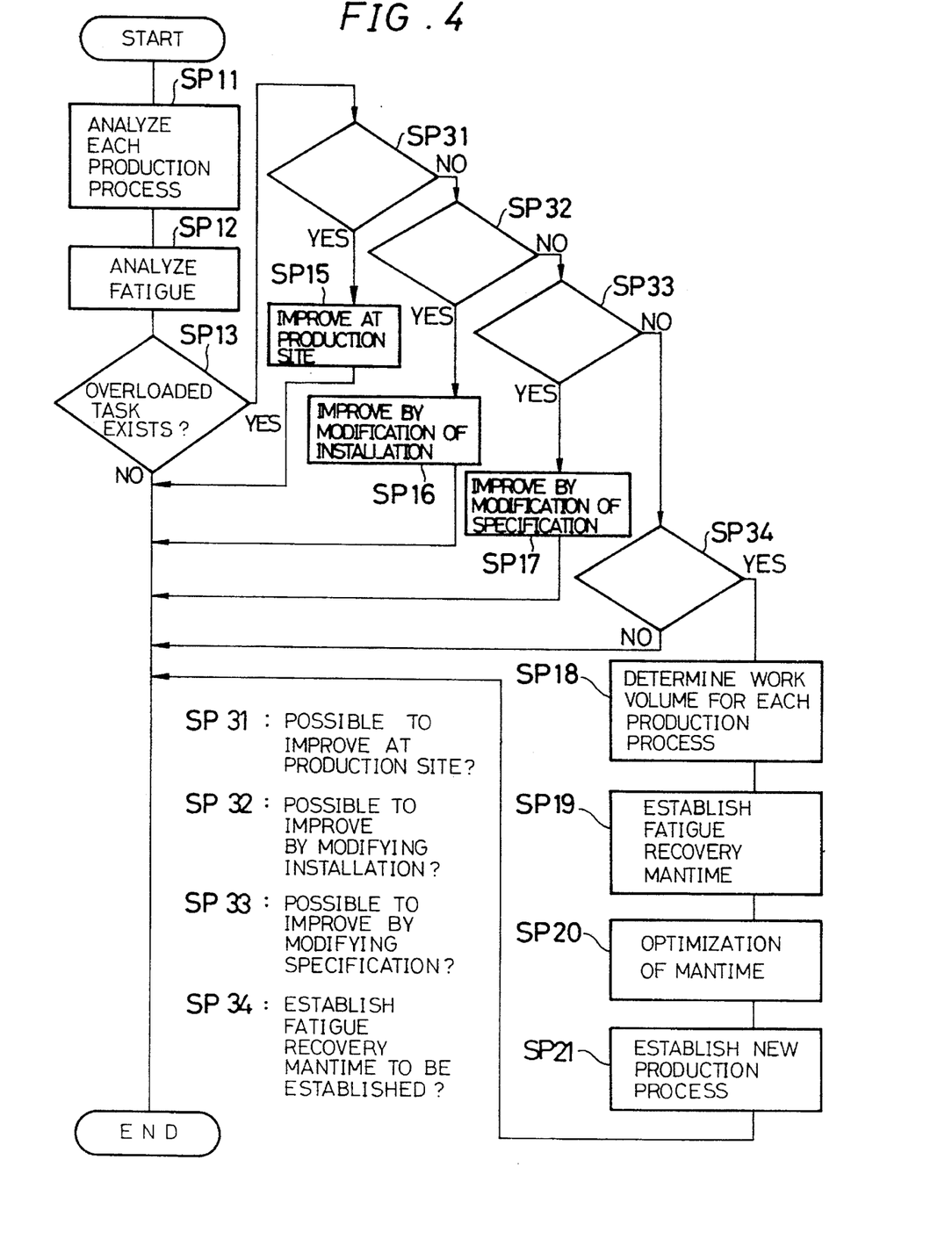
FIG. 4 is a flow chart of still another embodiment.

FIG. 4 illustrates a flow chart of the third embodiment of the invention, in which the same numerals are applied for steps which are common to those in FIG. 2 to simplify discussion.

Determining Improvement

STEP SP13 has already determined if the fatigue extent of a single task is great, that is, an overload work is included. If so, step 31 further determines if the single task can be improved at production site, and if so, advances to step 15. If NO, advanced to step 32.

Specifically, determination here is based on the fatigue score mentioned above, such as on whether it exceeds 5.5 or not.

Determination at SP31 and SP32

Then, step 31 determines if a single task can be improved at production site. If NO, step 32 determines if a single task can be improved by modifying installation, and if YES, advanced to step 16. If NO, advanced to step 33.

Specifically, determination here is based on the fatigue score mentioned above, such as on whether it exceeds 6.5 or not.

Determination at SP33

STEP SP33 determines if a single task can be improved by modifying specification, and if YES, advanced to step 17. If NO, advanced to step 34.

Specifically, determination here is based on the fatigue score mentioned above, such as on whether it exceeds 7.5 or not.

Establish Fatigue Recovery Mantime

When either steps 31, 32 and 33 have determined NO, then step 34 determines if a "fatigue recovery mantime" is to be established, and if YES, step 18 to 21 perform as mentioned in FIG. 3. If NO, the flow terminates. The determination criteria is based on if fatigue score exceeds determination step 31, 32, 33 and 34, followed by each execution step 15, 16, 17 and 18, respectively.

As is in the embodiment of FIG. 1, each program of the flow chart both in embodiments of FIGS. 3 and 4 may be also stored in a computer, wherein data input may be performed by a keyboard or the like input means, the results of determination through steps 14, 31, 32, 33 and 34 may be provided for workers through display means or printed matters and how to take any improvement according to such results may be specifically indicated, or the analyzed results may be made reference for each of the workers. Also, in the case of robots, each may be directly operated using each newly prepared production process.

When the program is to be stored in a computer as mentioned above, each of fatigue scores, which is effective for evaluating the fatigue extent of each single task, is in advance entered through a keyboard or the like and stored in appropriate memory means.

In FIG. 3, each of steps corresponds as follows:
Steps 11 to 13 to the fatigue recovery stage;
Step 15 to first improvement stage;
Step 16 to the second improvement stage;
Step 17 to the third improvement stage; and
Steps 18 to 21 to the fourth improvement stage.

Also, in FIG. 4, each of steps corresponds as follows:
Step 14 to the improvement selection stage;
Step 15 to the first determination stage;
Step 16 to the second determination stage;
Step 17 to the third determination stage; and
Step 34 to the fourth determination stage.

Figure 5:
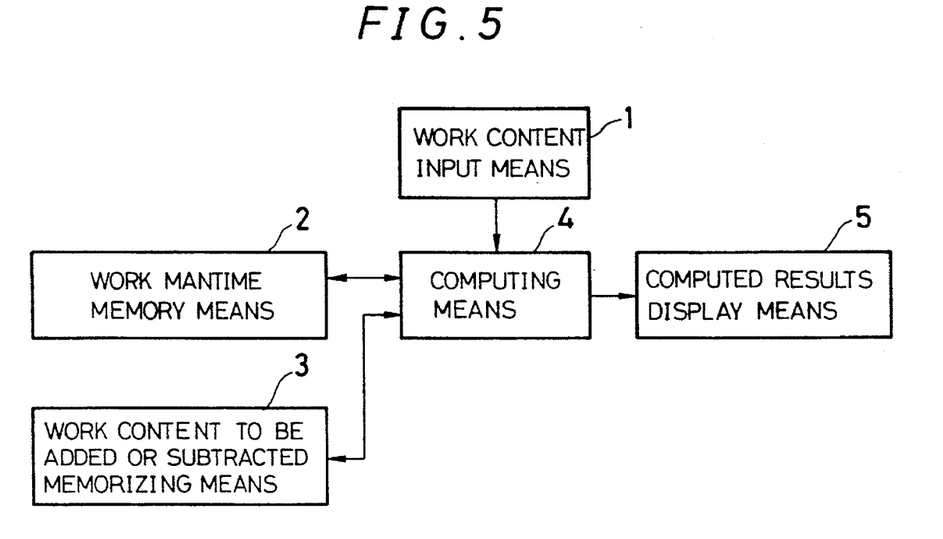
FIG. 5 is a summarized scheme of apparatus for calculating mantime.

FIG. 5 is a block diagram of the summary scheme of means for calculating mantimes, comprising means 1 for entering work content; memory means 2; memory means 3, calculation control means 4; and display means 5.

Input means 1, such as a keyboard, enters a predetermined work contents in the form of a name or code which represents such content. Instead of a keyboard, any data readout means employing mark sheets or the like may be also used as means 1.

The work contents entered by the means 1 include a plurality of single tasks which constitute each production process, such as those including: attaching specification labels, mounting cooler pipes or titan hooks, etc. each performed by workers and/or robots.

Once these single tasks are classified, the work volume of each task is represented based on the normal mantime, which mantime is stored for each production process in memory means 2.

At the working mantime memory means 2, the mantime stored for each single task can be selected, based on the work content entered through the input means 1.

A numeral 3 is an addition and subtraction object work content memory means. Into the memory means 3, each single task which is to be subject to addition or subtraction is especially stored. When such single task is entered through the input means 1, a compensation coefficient alpha or beta, which is to be multiplied to the mantime of such single task, is stored in the memory means 3.

More specifically, a compensation coefficient "alpha" is multiplied to the mantime of a single task, which mantime is to be corrected through subtraction, and therefore alpha<0. Instead, "beta" is multiplied to the mantime of a single task, which mantime is to be corrected through addition, and beta>0.

An example of single tasks, whose mantime is to be subject to addition, is a small task whose fatigue is evaluated small, such as tightening a bolt by means of a wrench. In this case, the bolt is tightened by the wrench, to which a gauge is attached so as to properly measure the tightening torque during being tightened, and therefore the final inspection may be not so precisely performed.

Instead, tasks to be subject to subtraction include those evaluated in greater fatigue extent, for example, hard postured tasks, difficult tasks, or heavy weight tasks mentioned above, and also may include tasks which incorporate any mental fatigue.

Figure 6:
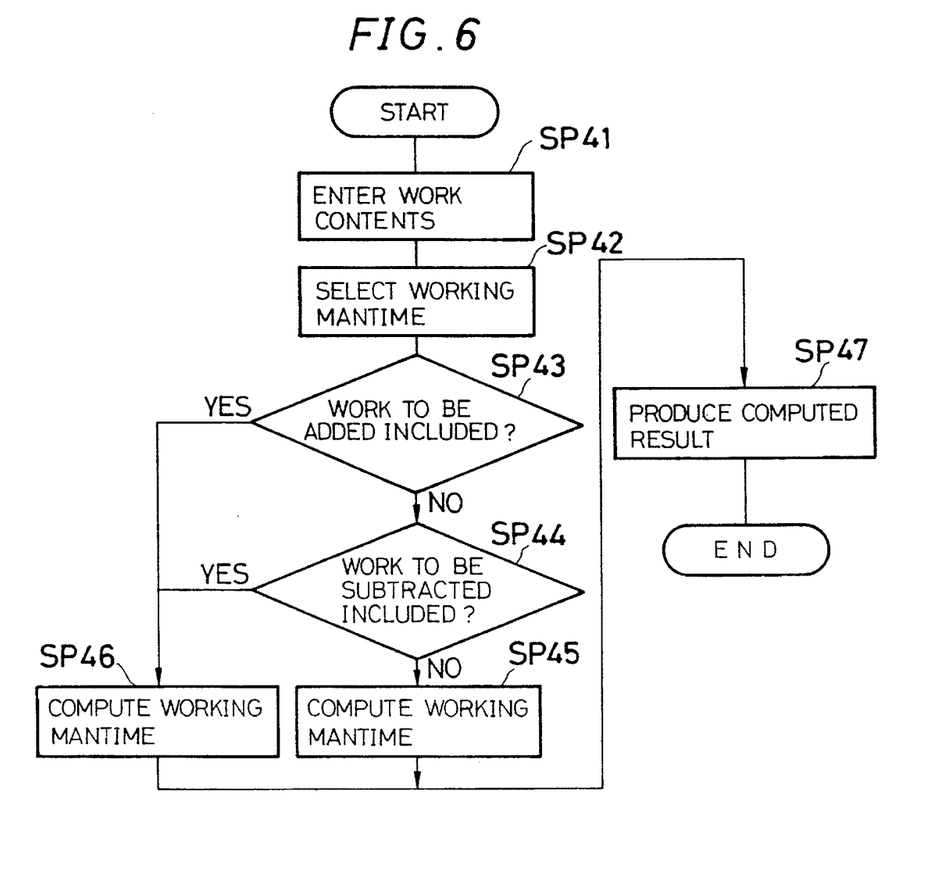
FIG. 6 a flow chart illustrating control operation of a working mantime calculating means.

Then, the control operation of calculating means 4 is hereinafter described with reference to the flow chart in FIG. 6. Calculation of each mantime is performed for each production process and each working means.

STEP SP41 applies all work contents of each single task by means of input means 1.

STEP SP42 selects a working mantime from mantime memory means 2 based on the contents entered through means 1.

STEP SP43 determines whether the entered content is to be subject to addition, and if NO, advanced to Step SP44. If YES, advanced to Step SP46.

STEP SP44 determines whether the entered content is to be subject to subtraction, and if NO, advanced to Step SP45. If YES, advanced to Step SP46.

STEP SP45 calculates all the working mantimes according to an equation, for example:

$$\text{SUM } t = t1 + t2 + (t3 \times n) + t4 + t5 \qquad (1)$$

This equation is the same as that previously described in the prior art, comprising the sum of each mantime t1 to t5. As can be seen, when there is a plurality of specific single tasks, its number n is multiplied to the mantime of the specific tasks, and the single task represented by its mantime t3 is counted "n".

STEP SP46 calculates all the working mantimes according to an equation, for example:

$$\text{SUM } t = t1 + t2 + (t3 \times n \times a) + (t4 \times b) + t5 \qquad (2)$$

Similar to equation (1), the equation (2) also comprises the sum of each factor of mantime t1 to t5. When there is a plurality of specific single tasks, its number n is multiplied to the mantime of the specific tasks. Further, when a single task represented by mantime t3 is a task which is subject to subtraction, a compensation coefficient "alpha" is multiplied. When a single task represented by mantime t4 is a task which is subject to addition, a compensation coefficient "beta" is multiplied. In this manner, through compensation by way of mulitiplying a coefficient "alpha" or "beta", a mantime of a single task is corrected to an optimal value suitable for the present situation.

Produce Calculated Result (SP47)

STEP SP47 displays on display means 5 all working mantime of production processes which are calculated in steps 45 and 46, separately for each working means.

Display means 5 includes a display unit, which is operated by control means 4, and displays each mantime of processes A to D, which is calculated separately for each working means a to d in control means 4.

Accordingly, in the calculation means of FIG. 5, based on the work contents supplied by content input unit 1, working mantimes stored in memory unit 2 are selected and accumulated. Further, when any of the work contents are determined to those subject to addition or subtraction stored in memory unit 3, a positive or negative compensation coefficient is multiplied to the mantime which is required to be corrected, and the obtained total mantime SIGMA t of the production process is indicated by means of display means 5.

More specifically, based on each work content, for which any correction through addition or subtraction of mantime is required, all of the newly obtained work mantime of processes A to D, which are obtained fop each working means (a to d), is displayed. Also, each of these mantime has been corrected in taking account of not only working time, but also the extent of workload, or fatigue extent, to modify to that conforms to actual work contents. Further, made reference to workers, or indicated by display or the like, unevenness of the mantime can be leveled to each other, such that the work volume of process D having a large number of working mantime is reduced, while the work volume of process A having a small number of working mantime is increased, or providing a rest period for the working means (d) which performs process D, whose mantime is more than others, thereby allocating an even work for each working means, and providing a production line without any equity.

In the case of a human worker, the labor environment is improved, and for a robot as working means, the robot is prevented from being continuously employed under the unnatural condition, resulting in preventing wear of specified components of the robot and ensuring a long period use of the robot.

Such an operation may be performed also by control means 4, instead of memory 3. Also, all work contents, working mantime and compensation coefficient Alpha or Beta, which are in advance stored in memory means 2 and compensation coefficient memory 3, and these may be rewritten as necessary in any time.

Figure 7:
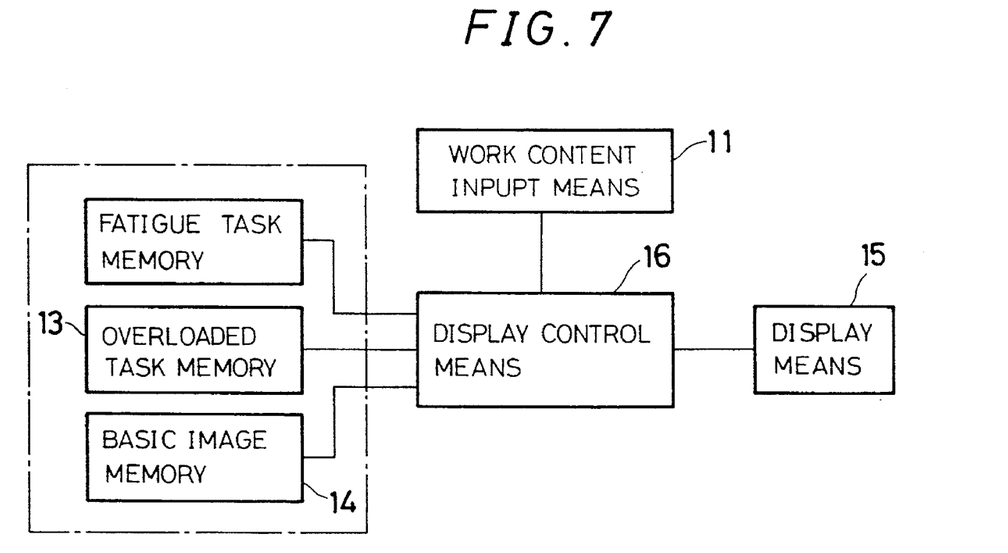
FIG. 7 is a schematic diagram illustrating a production process display means.

FIG. 7 is a schematic diagram of a display means capable of displaying all elementary tasks included in the above mentioned production process. This display means permits a production manager to readily acknowledge the production processes which include especially many of fatigue tasks or overloaded tasks. The means in FIG. 7 includes display means 11 for entering the elementary tasks, memory means 12 for selectively storing in advance tasks of greater fatigue extent among the elementary tasks entered by the means 11, means 13 for storing especially overloaded tasks among the above greater fatigue tasks, means 14 for storing basic images for displaying production processes and elementary tasks sequentially along the production flow, means 15 for displaying the images above, and display control means 16 for indicating coincidence between the displayed basic image and a task of an especially greater fatigue extent.

Each of these means is explained successively.

Similar to means 1 in FIG. 5, means 11 is also a keyboard or the like, and enters predetermined elementary tasks in the form of each name or code of tasks. In means 11, each single task is entered as each elementary task.

Fatigue task memory 12 stores fatigue tasks, which have been evaluated for each single task.

These fatigue tasks are assigned by fatigue scores, such that: those done by postures, such as done with one's knee deeply bent is assigned 10, in a squatting posture 9, with one's waist bent 7, with the upper body slightly forward bent 6, or with a posture sitting on the floor 4: as difficult tasks, with the finger tip loaded 5, a task with a manual hammer 5, those incorporating shock or vibration 4, the wrist in a unnatural situation 2: end heavy weight task 10.

Overloaded task memory 13 in advance stores overload tasks which are of greater fatigue extent, specifically those assigned a fatigue score equal or exceeding 4.5. For example, the fatigue tasks with one's waist deeply bent (10 points) are stored in memory 13.

A fatigue task can be also otherwise defined such that an overloaded task may be defined based on any fatigue score other than 4.5.

Figure 9:
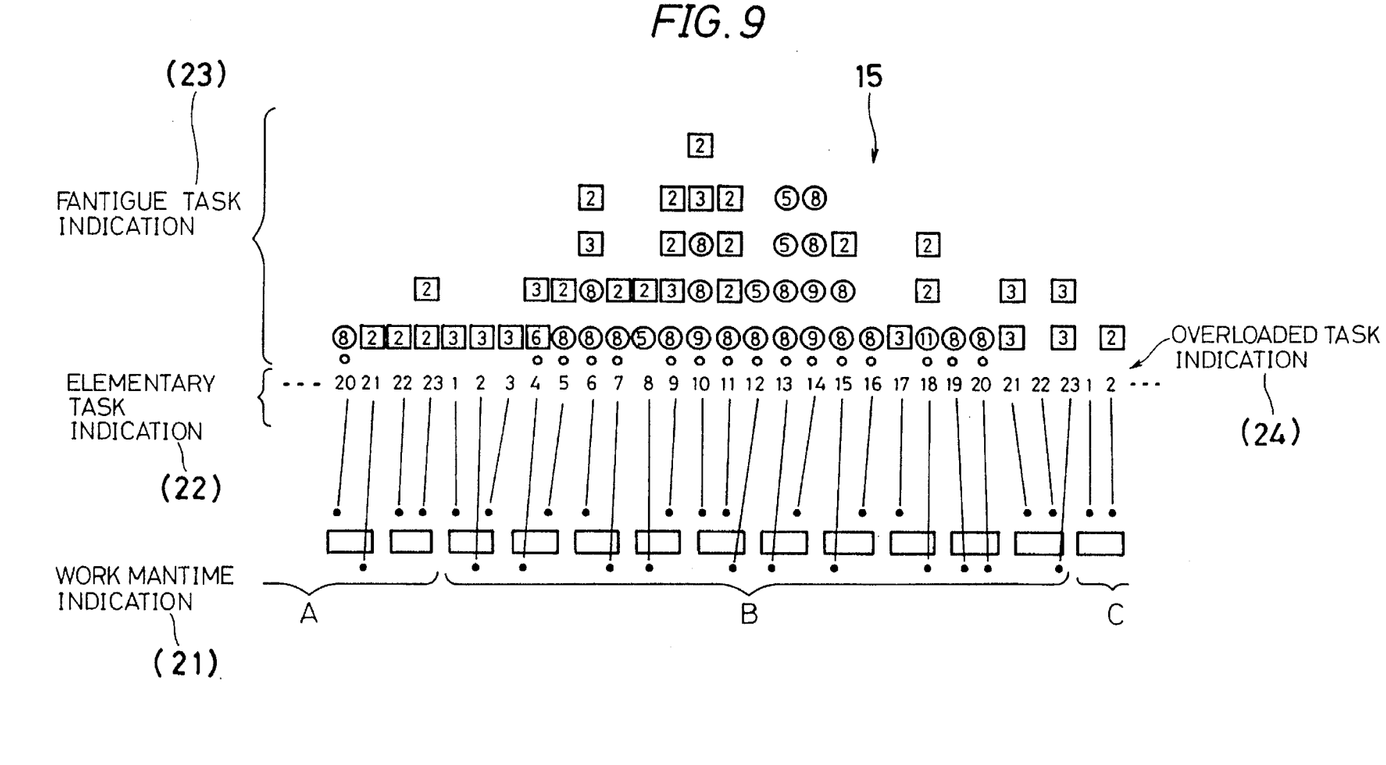
FIG. 9 is an illustration of the displayed content by the display means of FIG. 7.

As shown in FIG. 9, a basic image memory 14 stores a basic image illustrating production flow in succession. Display means 15 includes indication areas, including: area 21 for indicating production processes A, B, . . . ; area 22 for indicating all processes divided in a plurality of elementary tasks (1, 2, 3, 4, 5, 6 . . . ); and area 23 for indicating fatigue tasks (1, 2, 3, 4, 5, 6 . . . ).

In the indication area 23, there is indicated the kinds of tasks such that the "rectangular" symbol shows a task by which a load is applied on the worker's whole body, and the "circular" symbol shows a task by which a load is applied on the worker's hand.

The fatigue extent of each task is indicated in the form of vertically aligned symbols, so that any person for whom the displayed image is made reference, such as, a production manager, can readily recognize how many fatigue tasks are included within the elementary tasks.

Even one of overload tasks scored equal or exceeding 4.5, which is included and indicated in area 23, is indicated in area 24.

In usual, each one elementary task is performed by one of working means. Also, any one task may be performed by two or more of working means as necessary.

Figure 8:
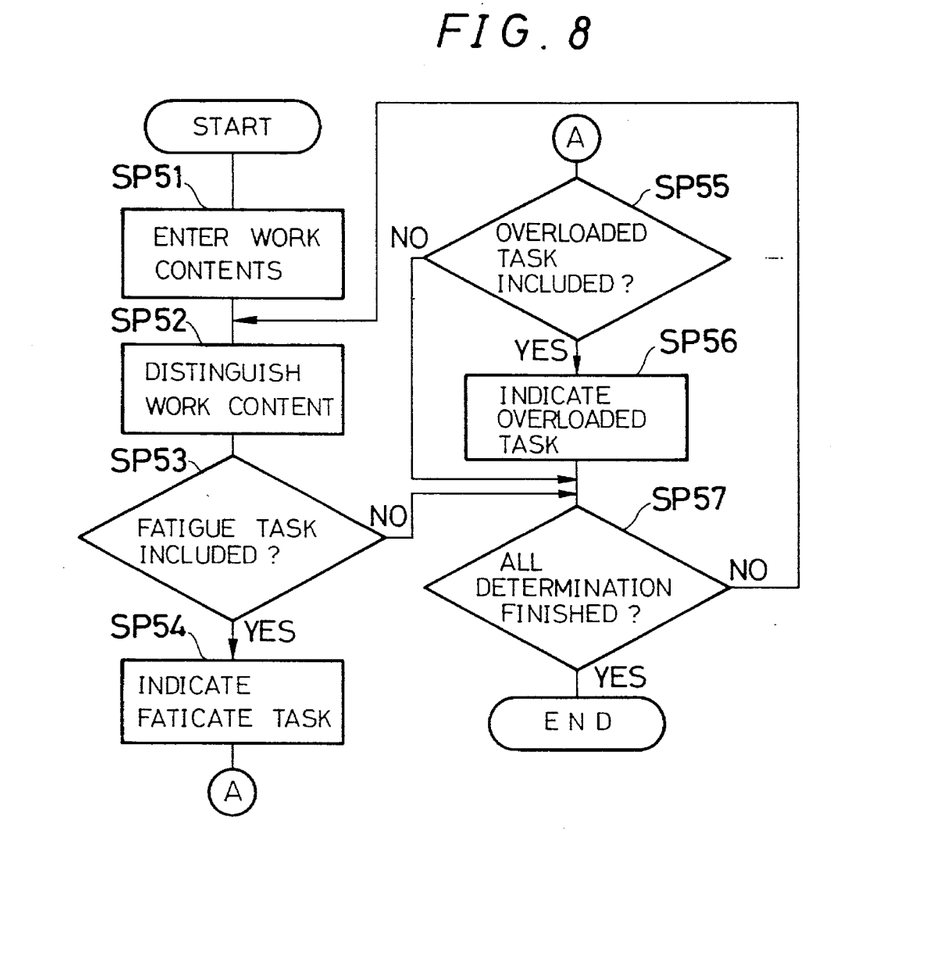
FIG. 8 is a flow chart showing control operation of the display means of FIG. 7.

FIG. 8 illustrates operation of display control means 16 above.

STEP SP51 enters all the single tasks (elementary tasks) by means of input unit 11.

STEP SP52 distinguishes if the elementary tasks, entered by input unit 11, correspond to the fatigue tasks stored in memory means 12, and further if correspond to the overloaded tasks stored in memory means 13.

STEP SP53 determines if the elementary tasks, entered by input unit 11, correspond to the fatigue tasks.

STEP SP54 displays each elementary task by means of a rectangular or circular symbol together with a fatigue score in the indication area 23 of display means 15.

STEP SP55 determines if the elementary tasks, entered by input unit 11, correspond to the overloaded tasks.

STEP SP56 displays in the indication area 24 of display means 15, if any overloaded tasks exist among fatigue tasks.

STEP SP57 determines if all the single tasks (elementary tasks) have been distinguished, and if NO, the Step SP52 iterates to distinguish. If YES, the flow terminates.

As stated above, any fatigue task, such as each of hard postured work, difficult work, and heavy weight work, is displayed in the indication area 23 of display means 15, and any overloaded task is displayed in the indication area 23, for permitting the production manager to acknowledge any difficult situation in production processes, and providing an impartial production line.

The process display means in FIG. 7 provides, in the case of human workers, improvement of environment, and prevents any specific components of robots from any wear and allows the robots to be operated for a long period.

Figure 10:
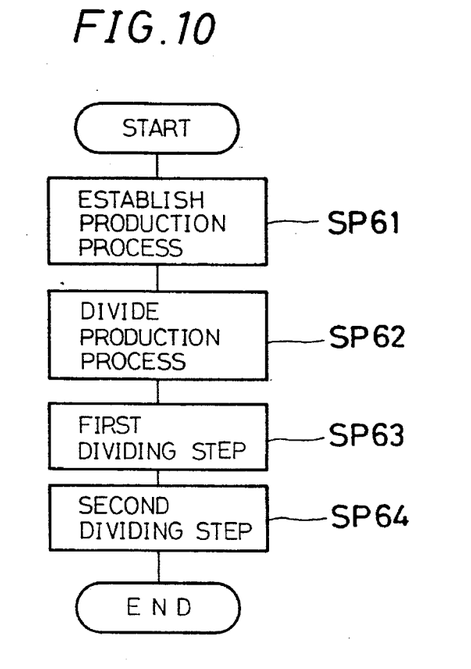
FIG. 10 is a flow chart of a further embodiment.

FIG. 10 illustrates a flow chart of the fourth embodiment of the invention.

STEP SP61 establishes production processes, that is, a fundamental line needed for production.

As described in the prior art technology, the automobile production line is composed of production processes which include mounting engine to the body, mounting doors or cooler pipes, etc.

Figure 11:
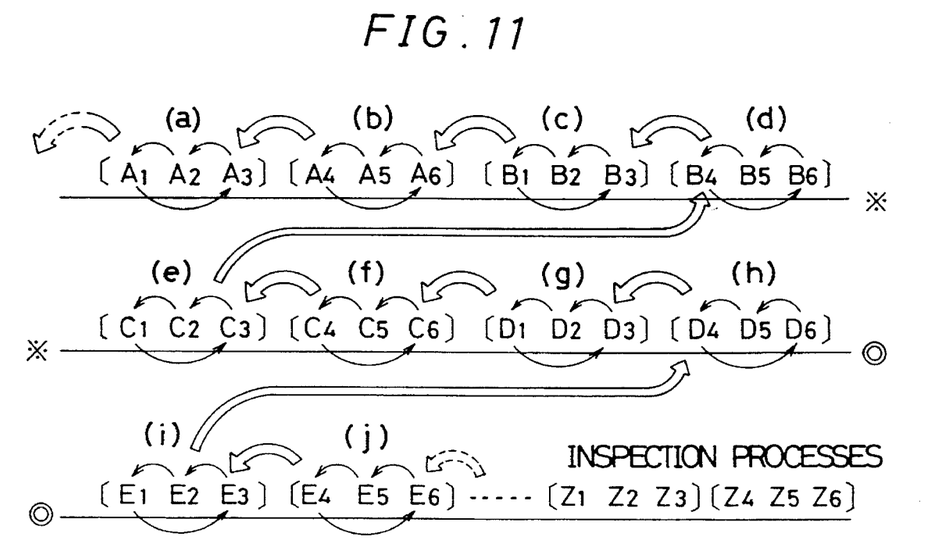
FIG. 11 is an illustration of an example of rotation of working means.

As can be seen in FIG. 11, working means A1 to A6, A1 to A6, B1 to B6, C1 to C6, D1 to D6, and elementary tasks performed by these working means constitute a fundamental line which forms the base of the production line.

For example, for working means A1 to A6, a first production process "attaching the mounting specification" is allocated. Similarly, each process is allocated such that:

for working means B1 to B6, a second production process "mounting cooler pipes":

for working means C1 to C6, a third production process "mounting titan hooks":

for working means D1 to D6, a fourth production process "mounting brake pipes":

for working means E1 to E6, a fifth production process "mounting an antenna": and for working means Z1 to Z6, a final process "various inspections".

Of course, the item of the process is flexibly allocated for the working means and not limited. Also, a specific number of processes is not limited as 6, but any more or less less number may be allowed. Hereinafter, all the tasks performed by working means A1, A2, etc. are defined as "elementary tasks".

The establishment of production processes according to the invention comprises a dividing step for dividing the first to fifth processes to further smaller processes (called blocks); a first exchange step for exchanging some elementary tasks within each block; and a second exchange step for exchanging the tasks contained in the latter block above between these blocks, and in such a manner, the line is recreated in the form of a modified new production line.

STEP SP62 divides all working means into a plurality of blocks to create a fundamental production line in the following manner.

STEP SP63 exchanges elementary tasks of working means, which may include either human workers or robots.

For example, in every predetermined period, such as a week, elementary tasks being performed by working means A1 is successively shifted to the other working means A2 and A3. In parallel thereto, tasks being performed by means A2 are successively shifted to means A3 and A1. Further, tasks being performed by A3 are successively shifted to means A1 and A2.

Thus, in block (a), working means A1 to A3 are subjected to rotation in a predetermined period, and any inequity which will occur among tasks of means A1 to A3 is prevented.

In the same manner, working means in each block are subjected to rotation, such that:
working means A4 to A6 in the 2nd block,
working means B1 to B3 in the 3rd block,
working means B4 to B6 in the 4th block,
working means C1 to C3 in the 5th block, and
working means C4 to C6 in the 6th block,
are respectively subjected to rotation to each other.

Also STEP SP63 provides another form of rotation, such that, with working means A1 to A6, B1 to B6, and C1 to C6 being maintained, elementary tasks performed by all of these means are shifted within blocks (a), (b), (c) . . . .

In other words, these working means and these elementary tasks are relatively shifted to each other.

Second Exchange Step

STEP SP64 provides a rotation, in which working means are exchanged between the different blocks (a), (b), (c) . . . , instead of in the same blocks as performed in STEP SP63.

Specifically, within every several months, in the 1st block (a):
First, working means A1 to A3 are replaced by means A4 to A3;
working means A4 to A6 are replaced by means B1 to B3;
working means B1 to B3 are replaced by means B4 to B6; and
working means B4 to B6 are replaced by means C1 to C3.
Similarly in the 2nd block (b):
working means A4 to A6 are replaced by means B1 to B3;
working means B1 to B3 are replaced by means B4 to B6;
working means B4 to B6 are replaced by means C1 to C3; and
working means C1 to C3 are replaced by means B4 to B6.
Further, in the 3rd block (c):
working means B1 to B3 are replaced by means B4 to B6;
working means B4 to B6 are replaced by means C1 to C3;
working means C1 to C3 are replaced by means C4 to C6; and
working means C4 to C6 are replaced by means C1 to C3.

Also, in the same manner, replacement is successively carried out in each of the 4th, 5th, and 6th blocks. Rotation of this type is called in the term of "Rotation A".

Further, an alternative rotation may be performed such that:
between the 1st to 3rd blocks, a group including working means A1–A3, a group of means A4–A6, and a group of means B1–B3, are replaced with each other, each of these as group, and further:
between the 4th to 6th blocks, a group including working means B4–B6, a group of means C1–C3, and a group of means C4–C6, are replaced with each other, each as group.

In addition, in such a rotation as performed between a number of groups, each group of working means may be arbitrarily selected. Rotation of this type is called in the term of "Rotation B".

Also, in STEP SP64, with working means, including A1–A6, B1–B6, and C1–C6, being fixed, only elementary tasks performed by these working means may be subjected to rotation between the blocks (a), (b), (c), etc. In conclusion, between blocks (a), (b), (c), etc., the working means, including A1–A6, B1–B6, and C1–C6, and elementary tasks are subjected to rotation to each other.

In summary, by this method, a new production line is created through the steps of:
establishing a fundamental line in STEP SP61, being formed by working means, and elementary tasks, performed by the working means mentioned above;

In STEP SP62, working means are divided in a plurality of groups such that:
a first block including working means A1–A3,
a second block including working means A4–A6,
a third block including working means B1–B3, etc.;

In STEP SP63, within each block (a), (b), (c), etc., the working means A1–A6, B1–B6, C1–C6, etc. are subjected to rotation; and Finally in STEP SP64, between each block (a), (b), (c), etc., working means A1–A6, B1–B6, C1–C6, etc. are subjected to rotation.

In summary, through STEPS SP61, 62, 63 and 64, the working means are subjected to rotation either within the blocks (a), (b), (c), etc. or between the blocks (a), (b), (c), etc. As a result, any overload is prevented from being applied on a specific means among the working means, thereby providing a impartial production line.

Figure 12:
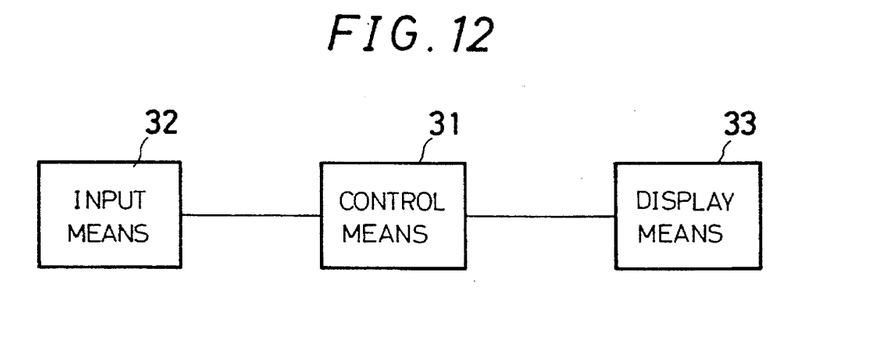
FIG. 12 is a schematic diagram illustrating a display means under application of the means of FIG. 10.

FIG. 12 is a block diagram of a display means, for which the method of constructing a production line is the unit 32, performs the Steps SP61 to 64, and establishes elementary tasks to be performed in a predetermined period by working means A1, A2, A3, A4, etc., thereby creating a new production line.

Display unit 33 displays the newly created production line.

Figure 13:
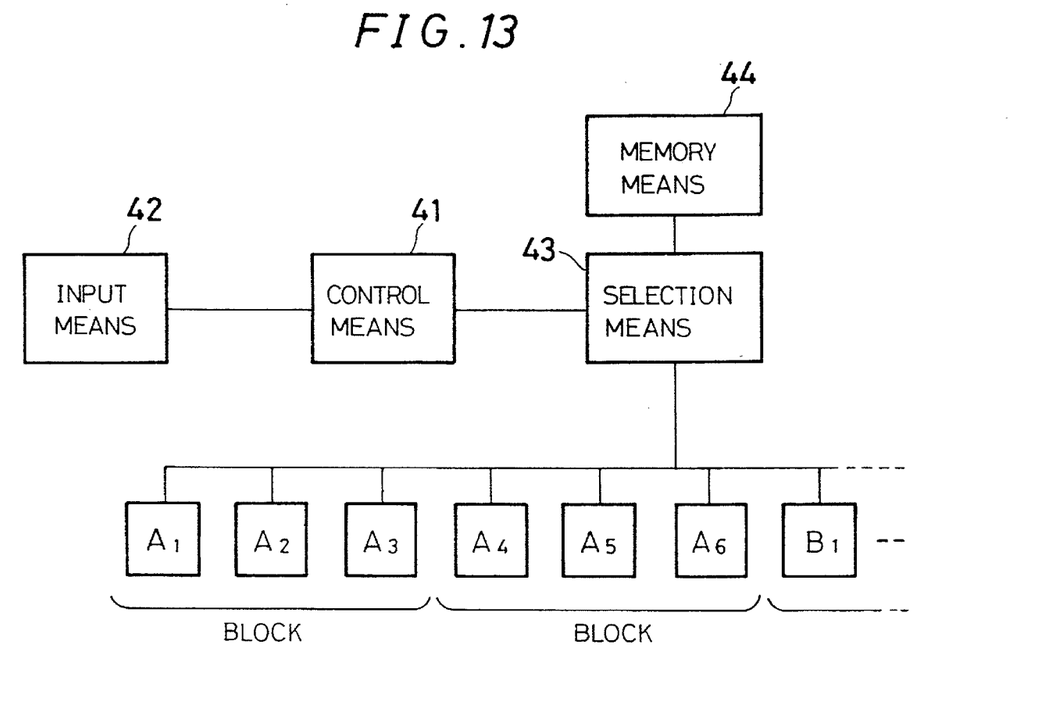
FIG. 13 is a schematic diagram illustrating a robot control system under application of the means of FIG. 10.

On the display unit 33, the rotations of working means applied in each period in the production line may be entirely as shown in FIG. 11, or partially, displayed, FIG. 13 is an example of a control system of a robot, for which the method of constructing a production line is applied, comprising a control unit 41 for storing a program of the flow chart in FIG. 10, an input unit 42 for entering data into the control unit 41, and a data selection unit 43 for selecting the teaching data stored in advance in memory unit 44 in accordance with the work contents, based on the data applied from the control unit 41. As done in input unit 32, in the input unit 42, the data, such as kinds of working means, a number of working means separately for each block, and selection as to rotation of A or B mentioned above, are in advance applied and stored.

Control unit 41, according to the data applied from the unit 42, performs the Steps SP61 to 64, and establishes elementary tasks to be performed in a predetermined period by working means A1, A2, A3, A4, etc., thereby creating a new production line.

Selection unit 43, based on the output signal produced from control unit 41, which indicates what a task is to be performed by the robot, selects teaching data stored in memory unit 44, and supplies these data for the robots A1, A2, etc.

Supplement of teaching data for the robots is carried out according to the rotation performed in a predetermined period. When the teaching data have been supplied for robots in this manner, reshuffle of the robot is unnecessary, but, only by changing the teaching data, the work content for the robot can be changed. When the teaching data for robots are changed in this manner, it is preferable to change the operating device at the end of the arm according to the changed work content as necessary in any time.

What is claimed is:

1. A method of employing a plurality of working means, said method comprising the steps of:

operating a production line by performing a plurality of production processes according to a first schedule, said production processes being performed by said working means;

determining first working mantimes for said working means for said first schedule, said step of determining said first working mantimes including the step of evaluating work volumes of said production processes performed by said working means;

establishing fatigue recovery mantimes for said working means, said step of establishing said fatigue recovery mantimes including the step of evaluating the fatigue extents of said production processes;

determining a modified schedule for said production line based on said first working mantimes and said fatigue recovery mantimes; and operating said production line according to said modified schedule, said modified schedule being different than said first schedule, said step of operating said production line according to said modified schedule being performed by said working means, and wherein the steps performed by said working means during said step of operating said production line according to said modified schedule are different than the steps performed by said working means during said step of operating said production line according to said first schedule.

2. The method as in claim 1, wherein said step of establishing fatigue recovery mantimes further comprises the steps of:

entering work contents for a plurality of single tasks into a computer;

selecting a working mantime from computer memory corresponding to said entered work contents;

determining whether said entered work contents is to be subject to addition or subtraction in order to select a compensation coefficient; and calculating said fatigue recovery mantimes based on said work contents, working mantimes, and compensation coefficients.

3. The method of claim 2, wherein said step of calculating said fatigue recovery mantimes is made according to the following equation:

$$\text{sum } t = t1 + t2 + (t3 \times n \times a) + (t4 \times b) + t5;$$

wherein "t1" to "t5" represent said working mantimes, "n" represents a number of single tasks, "a" represents a compensation coefficient alpha, and "b" represents a compensation coefficient beta.

4. The method as in claim 1, wherein said step of determining a modified schedule further comprises the steps of:

establishing a fundamental production line;

dividing said working means into a plurality of blocks along said fundamental production line; and exchanging elementary tasks performed by each of said working means between said working means.

5. The method as in claim 4, further comprising the step of rotating said working means between said blocks according to a rotation period.

* * * * *